US007306170B1

(12) United States Patent
Maksymec

(10) Patent No.: US 7,306,170 B1
(45) Date of Patent: Dec. 11, 2007

(54) LAWN SPRINKLER FLOW CONTROL DEVICE AND TOOL THEREFOR

(75) Inventor: Peter A. Maksymec, Las Vegas, NV (US)

(73) Assignee: Casino Advisory Services, LLC, Las Vegas, NV (US)

( * ) Notice: Subject to any disclaimer, the term of this patent is extended or adjusted under 35 U.S.C. 154(b) by 189 days.

(21) Appl. No.: 10/858,606

(22) Filed: Jun. 1, 2004

Related U.S. Application Data

(60) Provisional application No. 60/475,400, filed on Jun. 2, 2003.

(51) Int. Cl.
*A01G 25/06* (2006.01)

(52) U.S. Cl. ...................... 239/201; 239/203; 239/205; 239/570; 239/580; 138/37; 138/40; 138/44; 138/45

(58) Field of Classification Search .................... 239/1, 239/11, 525, 530, 532, 550, 551, 554, 556, 239/566, 600, 569, 201, 202, 203, 204, 205, 239/206, 570, 571, 580; 222/391, 464.3, 222/464.5, 523, 524, 525, 533; 138/45, 37, 138/40, 44; 403/326, 329; 411/134, 155; 401/146

See application file for complete search history.

(56) References Cited

U.S. PATENT DOCUMENTS

| | | | | | |
|---|---|---|---|---|---|
| 2,409,294 | A | * | 10/1946 | Martin | 138/44 |
| 2,593,315 | A | * | 4/1952 | Kraft | 138/45 |
| 3,181,584 | A | * | 5/1965 | Borowsky | 411/134 |
| 3,230,570 | A | * | 1/1966 | Flippen | 401/146 |
| 3,453,811 | A | * | 7/1969 | Crowley | 96/107 |
| 3,688,800 | A | * | 9/1972 | Hayner et al. | 138/42 |
| 3,750,710 | A | * | 8/1973 | Hayner | 138/40 |
| 4,031,936 | A | * | 6/1977 | Curtis | 411/134 |
| RE29,714 | E | * | 8/1978 | Hayner et al. | 138/42 |
| 4,275,767 | A | * | 6/1981 | Westfall | 138/40 |
| 4,313,471 | A | * | 2/1982 | Lissau | 138/45 |
| 4,505,877 | A | * | 3/1985 | Rion | 376/352 |
| 4,609,014 | A | * | 9/1986 | Jurjevic et al. | 138/45 |
| 4,667,700 | A | * | 5/1987 | Buzzi | 138/45 |
| 4,760,957 | A | * | 8/1988 | Rosenberg | 239/222.17 |
| 4,852,603 | A | | 8/1989 | Scaramucci | |
| 4,894,152 | A | * | 1/1990 | Colvin et al. | 210/198.2 |
| 4,915,135 | A | * | 4/1990 | Kellenbarger et al. | 138/44 |
| 4,938,259 | A | * | 7/1990 | Schmidt | 138/45 |
| 5,141,029 | A | * | 8/1992 | Naugle et al. | 138/44 |
| 5,174,500 | A | * | 12/1992 | Yianilos | 239/201 |
| 5,309,946 | A | * | 5/1994 | Ligneul | 138/39 |
| 5,372,306 | A | * | 12/1994 | Yianilos | 239/201 |
| 5,769,122 | A | * | 6/1998 | Baumann et al. | 137/625.33 |
| 5,816,497 | A | * | 10/1998 | Leon et al. | 239/76 |

(Continued)

*Primary Examiner*—Kevin Shaver
*Assistant Examiner*—Trevor McGraw
(74) *Attorney, Agent, or Firm*—Rob L. Phillips; Greenberg Traurig

(57) ABSTRACT

A device for restricting water flow through a conduit in a landscape sprinkler system, wherein the conduit comprises a hollow pipe having an interior wall, the device comprising a generally rigid disc having an external periphery shaped to conform to the interior wall of the conduit; attachment means for frictionally securing the disc traverse to the interior wall of the conduit, and, at least one aperture in the disc to permit water flow therethrough, wherein the total area of any apertures in the disc are from about 1% to about 40% of the cross-sectional area of the disc.

27 Claims, 6 Drawing Sheets

U.S. PATENT DOCUMENTS

| | | | | |
|---|---|---|---|---|
| 5,819,803 | A * | 10/1998 | Lebo et al. | 138/42 |
| 5,823,440 | A * | 10/1998 | Clark | 239/206 |
| 5,927,607 | A * | 7/1999 | Scott | 239/205 |
| 6,095,491 | A * | 8/2000 | Kriesel | 251/206 |
| 6,199,584 | B1 | 3/2001 | Brown et al. | |
| 6,247,656 | B1 * | 6/2001 | Wales et al. | 239/552 |
| 6,260,575 | B1 | 7/2001 | Brown et al. | |
| 6,263,911 | B1 | 7/2001 | Brown et al. | |
| 6,263,912 | B1 | 7/2001 | Brown et al. | |
| 6,558,250 | B1 * | 5/2003 | Paschke | 454/306 |
| 7,198,445 | B2 * | 4/2007 | Kramer | 411/155 |

* cited by examiner

LAWN SPRINKLER FLOW CONTROL DEVICE AND TOOL THEREFOR

CROSS-REFERENCE TO RELATED APPLICATIONS

This application claims the benefit of U.S. Provisional Application No. 60/475,400 filed Jun. 2, 2003.

BACKGROUND

1. Field of the Invention

This invention relates to a flow control device for limiting water flow to sprinkler heads in lawn sprinkler systems, and for preventing water waste from broken sprinkler heads.

2. Description of Related Art

In typical lawn sprinkler systems, manifolds of water supply pipes extend beneath the surface to be watered. Sprinkler heads are spaced at intervals around a matrix of buried supply pipes, and are attached to the underground pipes through risers which threadedly engage subterranean fittings and extend vertically to, or above, the surface of the ground. A plurality of heads are usually served through a single valve.

Sprinkler heads may be of the fixed or pop-up variety. Pop-up sprinkler heads allow the sprinkler head to mount relatively close to the surface of the ground, elevating only when activated by water pressure resulting from actuating a valve to the system, either manually or electrically. When the water pressure is shut off, a pop-up sprinkler head will return to its resting position.

A very common problem with lawn sprinkler systems is damage to the sprinkler heads caused accidentally or by vandalism, or loss of heads to theft. Sprinkler heads are easily knocked off by pedestrian traffic, children playing on the lawn, lawn maintenance personnel and equipment, and the like. Typically, a single sprinkler valve will service a manifold having multiple sprinkler heads, frequently up to six or eight per line. When one sprinkler head is knocked off, water gushes from the broken line, often creating a geyser a number of feet in the air. Depending on the water pressure and the size of the line, water loss through a broken sprinkler head can be anywhere from 10-45 gallons per minute. Thus, even in a short sprinkler cycle, hundreds of gallons of water will be wasted through a broken sprinkler pipe. In addition, flow is diminished through the other sprinkler heads on the line to the point where, if the broken head is not promptly repaired, landscaping will die around the other sprinkler heads on the line. In residential settings, since lawn sprinklers may be activated by a clock for only a few minutes at a time, a broken head may not be noticed for many days, resulting in flooding and erosion in the small area where the system is broken, dying of grass in the area of adjacent sprinkler heads, and a very substantial waste of water.

The problem resulting from damage to lawn sprinkler lines has been very well known for many years, and many attempts have been made to minimize the consequential damage caused by broken sprinkler systems. For example, Yianilos, U.S. Pat. No. 5,372,306, shows a sprinkler head mechanism having an upstream valve which closes automatically when the sprinkler head is removed. Similar devices are disclosed in Brown, et al., U.S. Pat. No. 6,260,575, U.S. Pat. No. 6,263,911, and U.S. Pat. No. 6,263,912. A flow control valve in the line shuts when the water flow exceeds a certain predetermined amount, precluding water loss from a broken sprinkler head.

Other check valves located upstream of the sprinkler head are shown in Scaramucci, U.S. Pat. No. 4,852,603 and Yianilos, U.S. Pat. No. 5,372,306. Scott, U.S. Pat. No. 5,927,607 shows a commercial pop-up sprinkler head having an inlet flow check valve assembly with a velocity control disc that helps to meter incoming air and/or water during the initial opening of the check valve assembly, resulting in a slower pop-up stroke of the riser and a lower impact at the end of the stroke. All of the known prior art involves somewhat complex check valve assemblies which are relatively expensive and which are difficult to retrofit on existing lawn sprinkler systems.

BRIEF SUMMARY OF THE INVENTION

The invention provides a flow-restricting disc which can be retrofitted into an existing landscape sprinkler system. The disc is shaped and sized to maintain a tight friction fit in the interior of a riser upstream of a sprinkler head. In its preferred embodiment, the flow restrictor is a slightly dished, disc having a generally circular periphery and having at least one opening therethrough, preferably centrally located. The disc has a plurality of flutes or serrations around the edge to provide a friction fit with the interior surface of a riser.

The flow-restricting disc is inserted into a portion of a sprinkler conduit upstream of the sprinkler head with its dished (i.e., convex) side down. Thus, the convex side of the disc is upstream of the concave side. When water pressure is exerted on the upstream side of the disc, the edges of the disc are pressed into the sides of the riser, ensuring a tight fit.

The flow restrictor discs of the invention are inserted into and removed from risers with a tool designed for this purpose. Risers are generally relatively short pieces of pipe or tubing that extend upwardly from the underground matrix to enable connections of a sprinkler head to the matrix. The tool comprises a generally rigid, elongate cylindrical rod having an axial pin at one end portion thereof for engaging the disc. The pin is inserted into a central opening in the disc, with the disc eventually engaging a mating convex surface of the rod. The disc is then pushed into the riser member by means of the rod, and the rod is withdrawn after the disc is fixed in the proper location.

A tool having at least one hook can be used independently of the insertion tool, or can be mounted at the other end of the rod. The hook is used for removal of the disc from the riser. To remove the disc, an end of the removal tool or the rod is inserted into the riser along its interior surface. Upon reaching the disc, the rod engages an edge portion of the disc, displacing it into an open position, with the axis of the disc being situated axially to the riser. The hooked end of the tool is then inserted into the riser to grasp a peripheral edge of the disc, which then can be easily lifted out from the riser.

BRIEF DESCRIPTION OF THE DRAWINGS

The invention is best understood with reference to the drawings, in which.

DETAILED DESCRIPTION OF PREFERRED EMBODIMENTS

Figure 1:
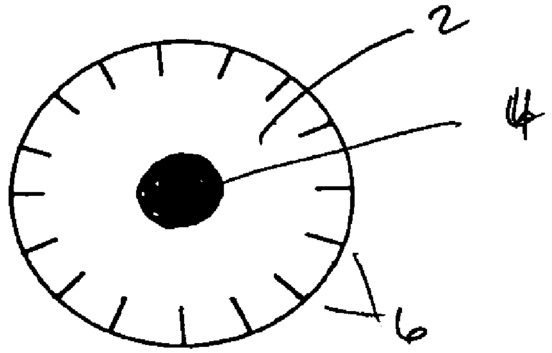
FIG. 1 is a plan view of the disc of the invention with a small central orifice.
Figure 2:
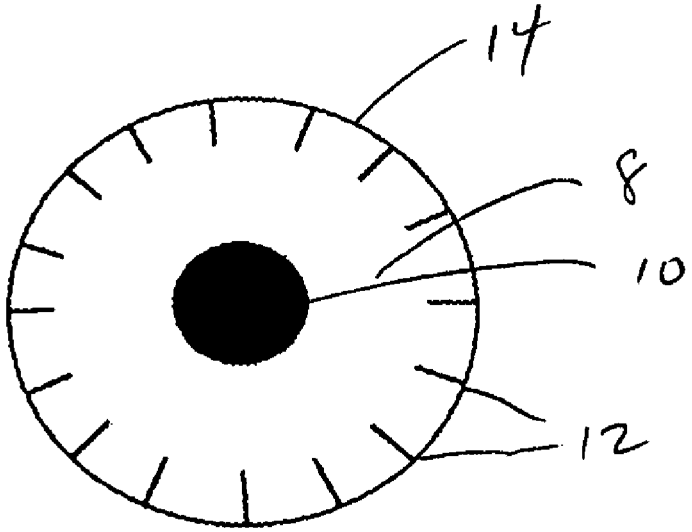
FIG. 2 is a plan view of the disc of the invention having a medium-sized central orifice.
Figure 3:
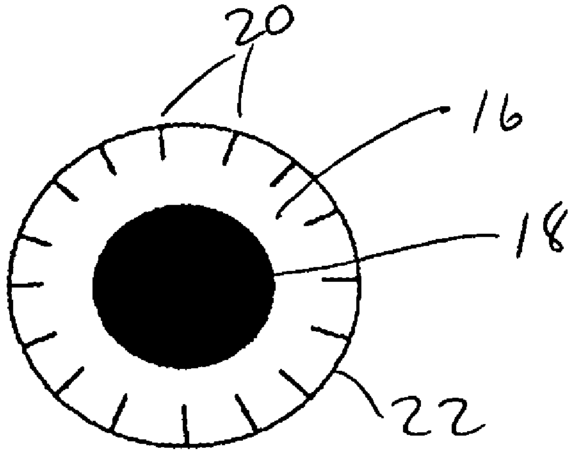
FIG. 3 is a plan view of the disc of the invention having a large center orifice.

Referring to the drawings, FIGS. 1-5 show various configurations of flow restrictor discs of the invention. FIG. 1 shows a disc 2 having a centrally located opening 4, relatively small in size. A plurality of radial cuts or flutes 6 exist around the periphery of the disc to create some flexibility or compression in the outward portions of the disc, thereby assisting its emplacement in a riser. FIGS. 2 and 3 show discs similar to the one shown in FIG. 1. FIG. 2 shows disc 8 having axial bore 10, and mounting grooves 12 in the peripheral edge 14. The disc of FIG. 3 is designed to allow a larger flow than the discs of FIGS. 1 and 2. The disc 16 has a large axial orifice 18, and flutes 20 in the periphery 22 of the disc.

Figure 4:
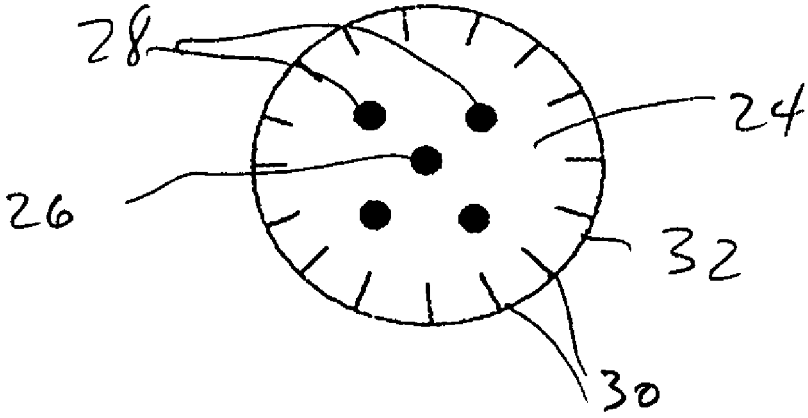
FIG. 4 is a plan view of a flow restrictor of the invention having five spaced orifices.

A slightly different variation of a disc of the invention is shown in FIG. 4. Disc 24 has a small axial opening 26, and four additional spaced openings 28 The additional four openings are spaced radially from the central opening 26. The disc shown in FIG. 4 also has radial cuts 30 around the periphery 32.

Figure 5:
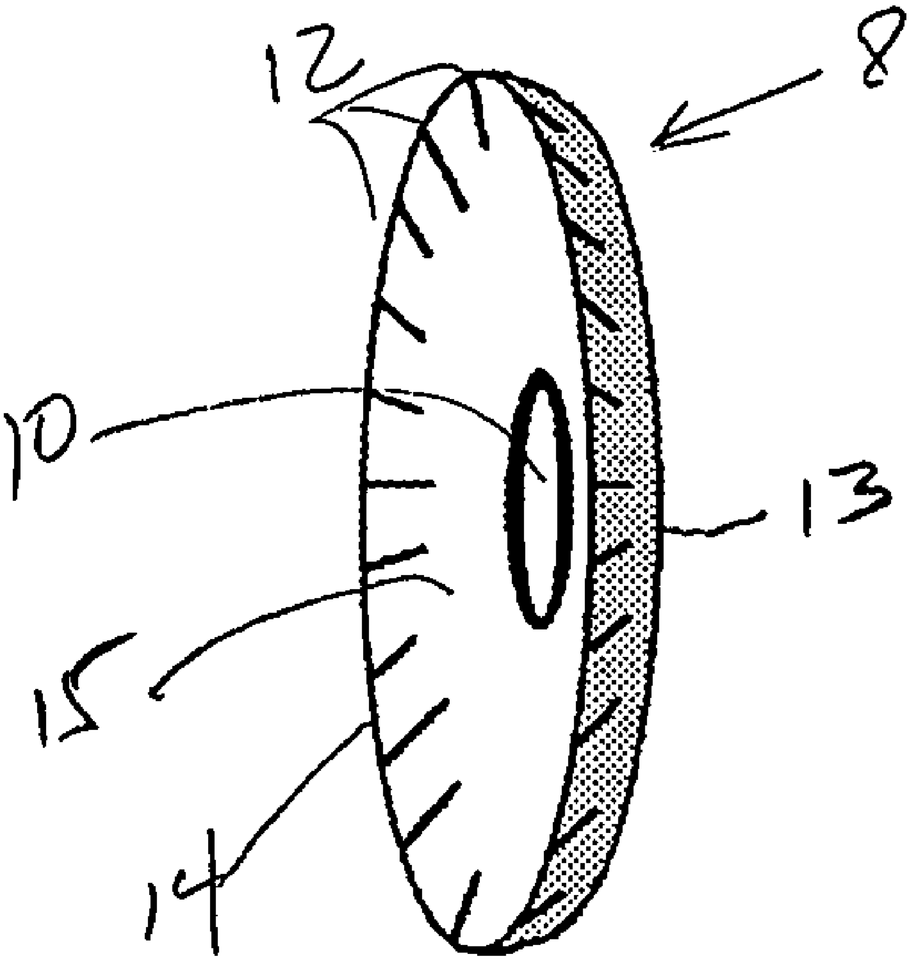
FIG. 5 is a perspective view of the flow restrictor shown in FIG. 1, 2 or 3.

FIG. 5 shows a side perspective view of the disc of FIG. 2. The disc is slightly dished, having an upper convex surface 15 and a lower concave surface 13. The disc is generally mounted in the riser with a convex surface 13 facing downwardly, i.e., on the upstream side.

Figure 6:
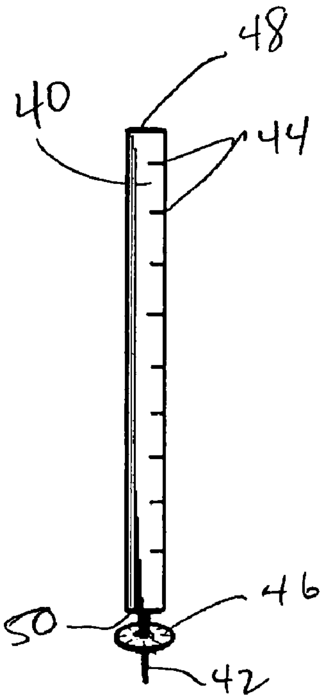
FIG. 6 is a side elevational view of a disc placement tool of the invention.

FIG. 6 shows an insertion tool for the emplacement and removal of discs. The tool consists of a generally rigid rod or dowel 40 having a circular cross-section of smaller diameter than the internal diameter of the riser. The rod has an upper surface 48 and a lower surface 50. A short pin 42 extends axially from the bottom surface 50 of the rod. The bottom surface 50 of the rod is dished slightly to mate with the concave upper surface of disc 46. If the riser is already in the ground, a scale 44 inscribed along the surface of the tool 40 can be used to assist in determining the depth of disc placement.

Figure 7:
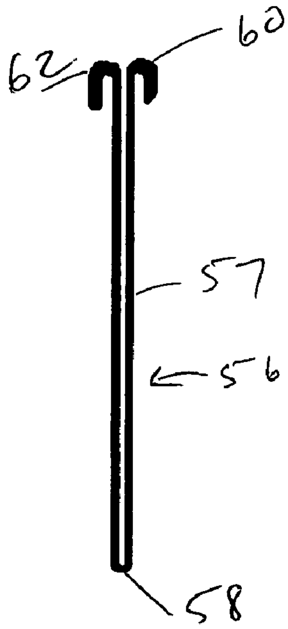
FIG. 7 is a side elevational view of a hooked tool for removing the disc.
Figure 9:
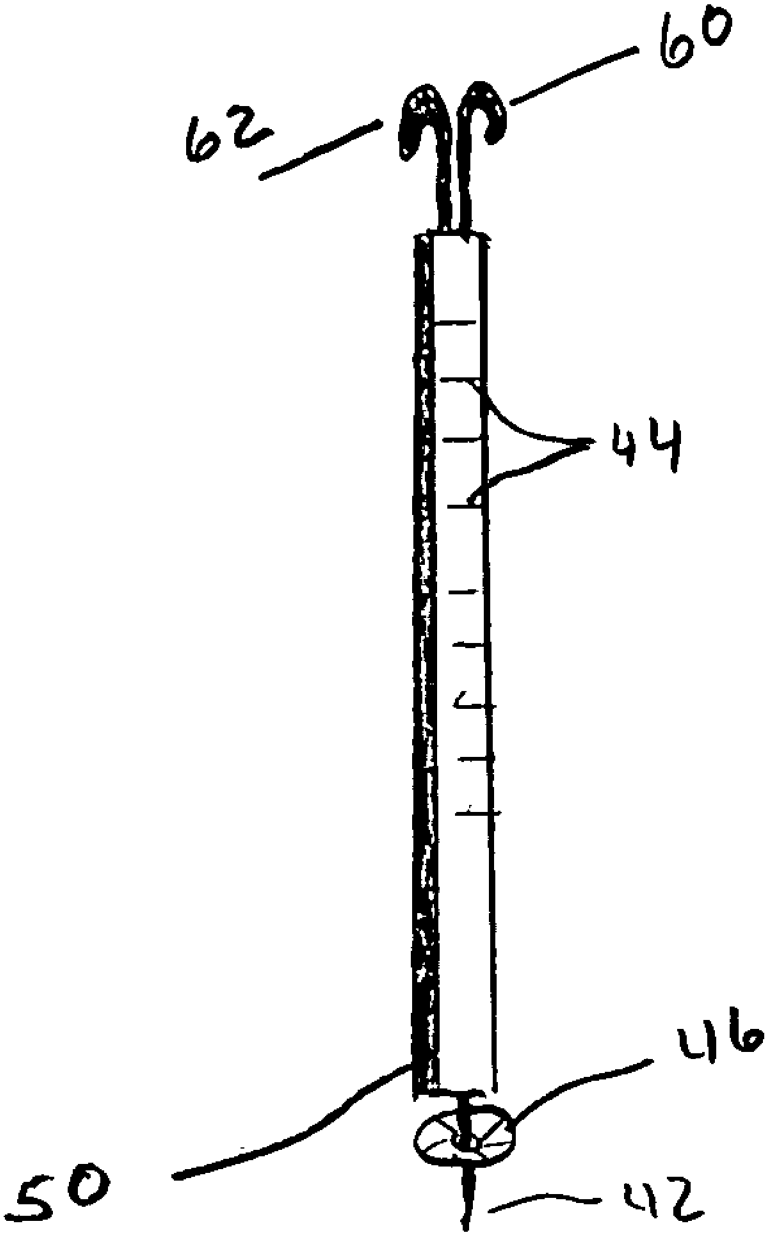
FIG. 9 is a perspective view of an insertion and removal tool.

Should it be necessary or desirable to remove a flow restrictor disc from a riser, it can simply be pushed through the riser by means of the insertion tool (which is an easy task if the riser is not mounted in the ground). Alternatively, the disc may be removed from the riser by means of hook tool 56, shown in FIG. 7. The hook tool has a grip portion 57 and a pair of hooks 60 and 62 at one end thereof. The removal tool shown in FIG. 7 is a stiff wire, bent to a U-shape at its distal end 58. FIG. 9 shows combination insertion and removal tool.

The easiest way to remove the disc from a riser which is mounted in the ground is to first slide the tool along the interior wall of the riser, end 58 first, contacting the disc near its peripheral surface. By pushing the removal tool down the riser, the disc will rotate from a position transverse to the riser to a position parallel to the water flow. In other words, the tool simply tips the disc about 90 degrees. The tool is then removed from the riser, and the hook end inserted. The hooks engage the disc periphery, and the disc can easily be pulled out. If desired, the insertion tool and removal tool can be combined, with the wire hooks being attached to the upper end 48 of the insertion tool.

Figure 8:
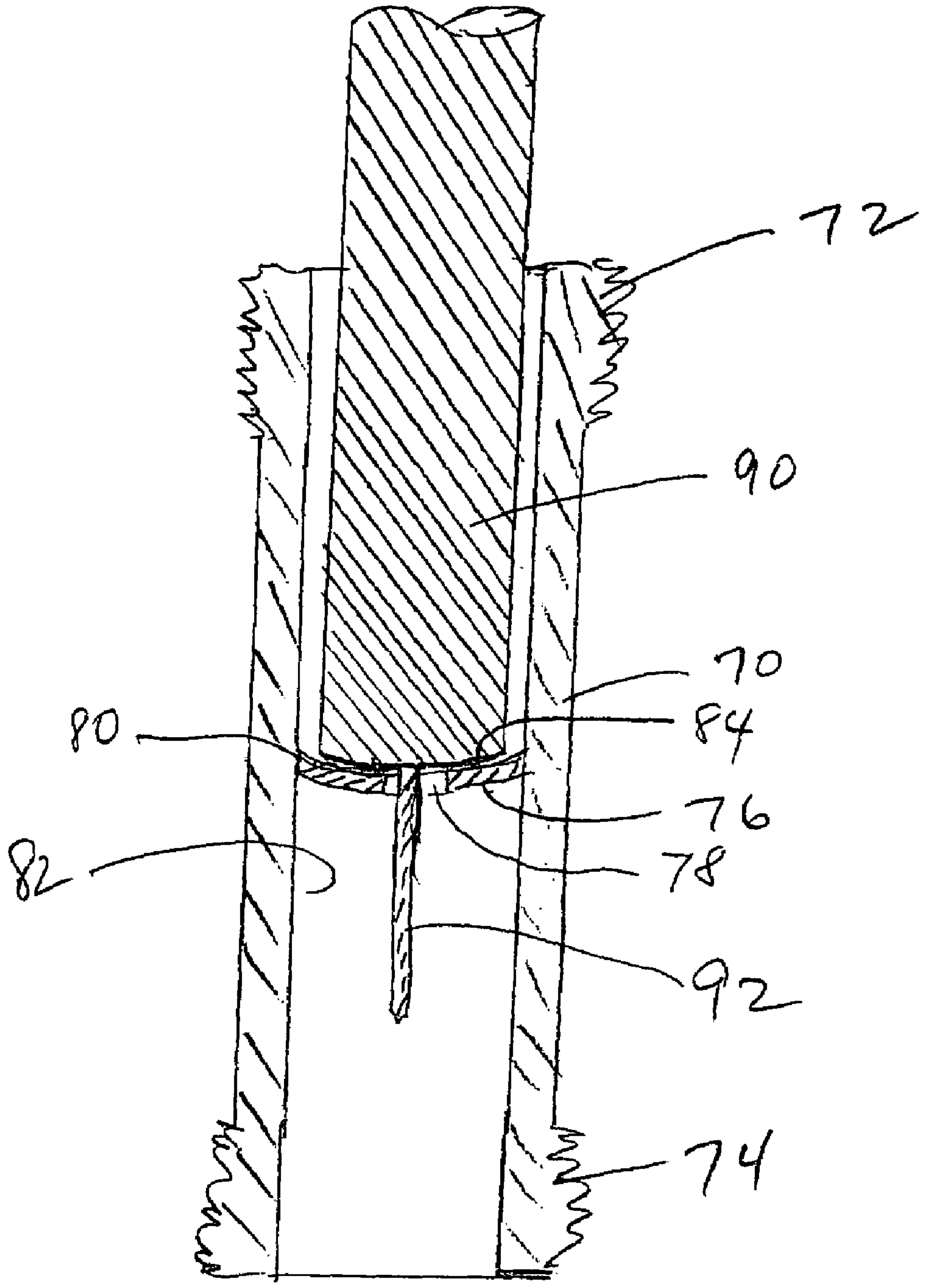
FIG. 8 is a side section view showing the placement of a flow restrictor of the invention in a riser using a placement tool of the invention.

FIG. 8 shows a side cross-section of a disc 76 as it is being mounted within a vertical riser 70. The riser has a threaded lower end 74 for engaging a tee or other similar fitting in the sprinkler system, and an upper threaded end 72 on which a sprinkler head can be mounted. The preferred place of location for disc 76 is even with or slightly lower than the threaded lower end 74. Insertion tool 90 has axial pin 92 extending from the dished lower surface 84 of the tool. Pin 92 extends through opening 78 in disc 76.

To insert a disc into the riser, the disc is placed on the insertion tool by sliding the disc over the pin 92 of the tool, with the dished lower surface 84 of the tool abutting the upper concave surface 80 of the disc. The tool is then pushed into the riser, with the fluted edges of the disc sliding downwardly into the riser frictionally engaging interior wall 82 of the riser. While the riser is generally a molded plastic piece, the interior surface is not completely uniform, and the flutes in the periphery of the disc provide some flexibility which eases insertion of the disc into the riser. When the riser has been placed into the appropriate location, the tool is removed, and the flow restrictor remains in place.

The discs are preferably made from metal, such as aluminum or stainless steel, although they may be fabricated from plastic or rubber. Since exposure to water is necessary, a non-corrosive material is preferred. The discs are relatively thin, generally having a thickness of from 0.007-0.05 inches, preferably 0.01-0.03 inches. While the discs are generally rigid, they have slight flexibility which will allow the disc to contour to the side of the interior of the riser pipe, which is often not perfectly round. The peripheral flutes also assist in providing a slight flexibility to the outer surface of the disc, allowing it to better conform to the interior shape of the pipe. The flutes may be radial, or slightly offset from radial, and may be straight cuts, jagged edges, serrations, or other irregular contours which assist a frictional grip fit between the edge of the disc and the interior pipe wall.

The dished shape of the flow restrictor discs of the invention also assists in keeping the disc in place. It is not uncommon for sprinkler system water pressure to be in the range of 40-70 psi, creating a substantial pressure drop across the disc when water is flowing. As a result, the pressure on the bottom convex surface of the dish tends to force the dish to flatten, thereby forcing the peripheral edge of the disc into the plastic. This self-gripping feature of the disc helps to ensure that the disc will not be ejected from the riser if the sprinkler head is broken off. Those skilled in the art will recognize that the flow restriction described could also be accomplished by restricting the interior diameter of the conduit by permanently molding or fabricating a ledge, shelf, or rim around the interior surface of the conduit such that the ledge would partially block, as described herein, the opening through the conduit.

The discs are of course sized to fit the interior of the pipes. The diameter of the disc must be very slightly greater than the interior of the pipe in order to achieve a satisfactory friction fit between the two. For example, the internal diameter of a nominal one-half inch riser may vary from 0.56"-0.58", and a suitable disc would have a diameter equal to or slightly greater than the largest interior measurement of the riser. Since there is variation of the diameter along the riser tube, the disc must be sufficiently malleable or flexible to be able to traverse the tube. For stainless steel or aluminum discs, depending on the interior diameter of the riser pipe, suitable discs may have diameters of ¼"-1". Metal discs will have thicknesses of 0.01"-0.03", though the thickness may vary with the material. The discs must have sufficient strength so as not to be deformed by water pressure should a sprinkler head break off, but should have sufficient peripheral flexibility in order to permit the disc to slide into the pipe and establish a firm frictional engagement with the interior surface.

The degree of flow restriction imparted by a disc generally depends upon the ratio of the area of the holes in the disc to the entire area of the disc. The desired degree of restriction may depend on characteristics of the sprinkler head used, and the water pressure. The water pressure in the line may vary anywhere from 25-70 psi, and could be higher for pressurized commercial applications. The flow through the orifice is proportional to the square root of the pressure drop across the orifice. For most cases, the area of the total openings through the disc will comprise about 1%-40% of the area of the entire disc, preferably 2%-15% of the total area, still more preferably 3%-8%. In other words, when in place the disc will block from 60% to 98% of the opening through the tubing, preferably from 85% to 98%, and more preferably from 92% to 98%. Those skilled in the art will recognize that discs of different sized apertures will be used in accordance with the pressure at the sprinkler head.

An unexpected benefit of the use of the flow restrictors of the invention arises from the fact that most residential and light commercial sprinkler heads are designed to function best at a pressure of 25-35 psi. If the water pressure is within the design limits, the area coverage will be accurate and uniform, and the droplet size of the spray will be sufficient to disperse the water uniformly over the entire area covered by the sprinkler head. However, most municipal water supplies have pressures significantly greater than the design criteria for the sprinkler heads. In such cases, higher line pressures result in a finer spray being emitted from the head, resulting in misting, excessive evaporation, and inability for the fine droplets to reach the periphery of the Intended coverage pattern. By reducing the aperture in the flow restrictor, a significant pressure drop is encountered across the flow restrictor, thereby reducing the pressure downstream of the flow restrictor to a level more closely aligned with the sprinkler head design pressure. This eliminates puddling around the head and evaporation due to misting, and permits better distribution of droplets uniformly around the head at a slower rate, allowing water distributed to the turf to seep slowly into the ground, rather than puddle or run off.

In the event that a sprinkler head breaks off or a riser is broken above the flow restrictor, water escapes only through the restricted area of the riser pipe. The result is a far smaller water loss than if the riser were not in place. In addition, pressure will still be maintained in the system sufficient for operation of the remaining heads on the same branch of the line as the broken head. Further, rather than shutting off the flow completely to the broken riser, a stream of water will still be emitted which will be visible, thereby enabling the homeowner to see that repairs are necessary.

The following examples are illustrative of the invention.

EXAMPLE 1

Using a ½" diameter riser in an irrigation system having a 42 psi water supply, tests were conducted with various flow restrictor discs having different diameters of openings in the disc. The results were as follows:

| Disc | Flow Rate, gpm |
|---|---|
| None | 16 |
| 3/32" opening | 1.5 |
| 9/64" opening | 3.0 |
| 11/64" opening | 3.8 |

Performance of a sprinkler head with a disc in place does not deteriorate, and actually improves, with the discs in place.

EXAMPLE 2

A typical application for the flow restrictor was calculated by the Center for Irrigation Technology at California State University, Fresno.

A commonly used sprinkler head for a residential application is the Rainbird 1800 head, designed to operate at a feed pressure of 25 psi. A more typical supply pressure is 45 psi. For proper operation, a pressure drop of 20 psi would put the pop-up sprinkler head at its best operating pressure.

The correct orifice size for this system using a 10F nozzle in the head is calculated to be a 3/16" orifice. With the disc in place and the head removed, the flow rate is 4.2 gpm (an improvement of 75% over the flow of 16 gpm without the disc).

Using a 10F nozzle in the head, the correct orifice size is 9/64", giving a head pressure of 25 psi and a free flow, without the head, of 2.37 gpm.

Thus, the flow restrictor improves the head performance, as well as reducing water loss in the event of head removal.

I claim:

1. A device for restricting water flow through a water conduit in a landscape sprinkler system, wherein the conduit comprises a hollow pipe having an interior wall, the device comprising:

a generally rigid disc having a plurality of radial cuts around an external periphery shaped to conform to the interior wall of the conduit wherein said external periphery is operable to frictionally secure the disc transverse to the interior wall of the conduit, adjacent of said radial cuts defining segments of the rigid disc therebetween wherein a plurality of said defined segments, which generally abut one another, circumscribe the entire periphery of the rigid disc; and at least one aperture in the disc to permit water flow therethrough, wherein the total area of any apertures in the disc are from about 1% to about 40% of the cross-sectional area of the disc.

2. The device of claim 1 wherein the total area of any apertures in the disc are from about 2% to about 15% of the cross-sectional area of the disc.

3. The device of claim 1 wherein the total area of any apertures in the disc are from about 3% to about 8% of the cross-sectional area of the disc.

4. The device of claim 1 wherein the disc is dish shaped.

5. The device of claim 1 wherein the disc has at least one central aperture.

6. The device of claim 1 wherein the disc has a thickness of from about 0.007 inches to about 0.05 inches.

7. The device of claim 1 wherein the disc has a thickness of from about 0.01 inches to about 0.03 inches.

8. The device of claim 1 wherein the disc has a generally circular periphery.

9. The device of claim 1 wherein the disc is removably mounted to the interior wall of the conduit.

10. In combination, a water conduit for a landscape sprinkler system, said conduit comprising a hollow pipe member having an interior wall having a generally circular cross-section; and a flow-restricting device mounted across the interior cross-section of the conduit comprising a disc having a plurality of radial cuts around a peripheral edge portion frictionally secured to the interior wall of the conduit, adjacent of said radial cuts defining segments of the rigid disc therebetween wherein a plurality of said defined segments, which generally abut one another, circumscribe the entire periphery of the rigid disc, said disc having at least one aperture therethrough, the total of the cross sectional areas of any opening through the disc being from about 1% to about 40% of the cross-sectional area of the interior of the conduit.

11. The device of claim 10 wherein the total area of any apertures in the disc are from about 2% to about 15% of the cross-sectional area of the disc.

12. The device of claim 10 wherein the total area of any apertures in the disc are from about 3% to about 8% of the cross-sectional area of the disc.

13. The device of claim 10 wherein the disc is dish shaped.

14. The device of claim 10 wherein the disc has at least one central aperture.

15. The device of claim 10 wherein the disc has a thickness of from about 0.007 inches to about 0.05 inches.

16. The device of claim 10 wherein the disc has a thickness of from about 0.01 inches to about 0.03 inches.

17. The device of claim 10 wherein the disc has a generally circular periphery.

18. The device of claim 10 wherein the disc is removably mounted to the interior wall of the conduit.

19. A method of controlling flow through a conduit in a sprinkler system having at least one sprinkler head comprising:

removably mounting a disc into an interior of the conduit upstream of the sprinkler head, said disc having a plurality of radial cuts around an external periphery and at least one aperture therethrough, adjacent of said radial cuts defining segments of the rigid disc therebetween wherein a plurality of said defined segments, which generally abut one another, circumscribe the entire periphery of the rigid disc, the total area of all apertures being from about 1% to about 40% of the cross-sectional area of the interior of the conduit.

20. The method of claim 19 wherein the total area of any apertures in the disc are from about 2% to about 15% of the cross-sectional area of the disc.

21. The method of claim 19 wherein the total area of any apertures in the disc are from about 3% to about 8% of the cross-sectional area of the disc.

22. The method of claim 19 wherein the disc is dish shaped.

23. The method of claim 19 wherein the disc has at least one central aperture.

24. The method of claim 19 wherein the disc has a thickness of from about 0.007 inches to about 0.05 inches.

25. The method of claim 19 wherein the disc has a thickness of from about 0.01 inches to about 0.03 inches.

26. The method of claim 19 wherein the disc has a generally circular periphery.

27. The method of claim 19 wherein the disc is removably mounted to the interior wall of the conduit.

* * * * *